(12) United States Patent
Nyga et al.

(10) Patent No.: US 11,933,400 B2
(45) Date of Patent: Mar. 19, 2024

(54) CHAIN GUIDE ASSEMBLY FRAME

(71) Applicant: TSUBAKIMOTO CHAIN CO., Osaka (JP)

(72) Inventors: Volkmar Nyga, Osaka (JP); Seigo Ohsawa, Osaka (JP); Sung-Hwan Lim, Osaka (JP); Munehiro Maeda, Osaka (JP); Yuji Oshima, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/080,261

(22) Filed: Dec. 13, 2022

(65) Prior Publication Data
US 2023/0193795 A1 Jun. 22, 2023

(30) Foreign Application Priority Data
Dec. 20, 2021 (JP) ................................. 2021-205914

(51) Int. Cl.
*F16H 7/18* (2006.01)
*F02B 67/06* (2006.01)
(Continued)

(52) U.S. Cl.
CPC ............... *F16H 7/18* (2013.01); *F02B 67/06* (2013.01); *F16H 57/0424* (2013.01); *F16H 7/06* (2013.01);
(Continued)

(58) Field of Classification Search
CPC ...... F16H 7/06; F16H 7/08; F16H 2007/0802; F16H 2007/0842; F16H 2007/0844;
(Continued)

(56) References Cited

U.S. PATENT DOCUMENTS

| 4,480,609 A | * 11/1984 | Hayashi | ............... F02F 7/0073 123/195 C |
| 4,607,601 A | 8/1986 | Kohler | |

(Continued)

FOREIGN PATENT DOCUMENTS

| DE | 102018129532 B3 * | 12/2019 | ............... F16H 7/18 |
| DE | 102018117985 A1 * | 1/2020 | ............. F01L 1/022 |

(Continued)

OTHER PUBLICATIONS

Extended (Supplementary)European Search Report dated Apr. 28, 2023, issued in counterpart EP Application No. 22214584.9. (10 pages).

*Primary Examiner* — Michael R Mansen
*Assistant Examiner* — Raveen J Dias
(74) *Attorney, Agent, or Firm* — WHDA, LLP

(57) ABSTRACT

To provide a chain guide assembly frame capable of efficiently collecting the oil that adhered to various parts of the chain guide assembly, and guiding the collected oil to predetermined locations, to allow efficient use of oil, with a simple structure. The chain guide assembly frame includes driven sprocket holding portions, a fixed chain guide, and a pivoting chain guide holding portion on a main body. A drive sprocket holding portion is provided at a position lower than the driven sprocket holding portions. The main body includes a concave and/or convex oil passage that extends from an upper part toward a lower part to guide the oil toward above the drive sprocket holding portion.

8 Claims, 2 Drawing Sheets

(51) Int. Cl.
  *F16H 7/06* (2006.01)
  *F16H 7/08* (2006.01)
  *F16H 57/04* (2010.01)
(52) U.S. Cl.
  CPC ........ *F16H 7/08* (2013.01); *F16H 2007/0842* (2013.01); *F16H 2007/0872* (2013.01); *F16H 2007/0893* (2013.01); *F16H 2007/185* (2013.01); *F16H 57/042* (2013.01)
(58) Field of Classification Search
  CPC ..... F16H 2007/0863; F16H 2007/0872; F16H 2007/0874; F16H 2007/0893; F16H 7/18; F16H 2007/185; F16H 57/031; F16H 57/042; F16H 57/0421; F16H 57/0424; F16H 57/0489; F02B 67/00; F02B 67/04; F02B 67/06; F02F 7/0073; F02F 2007/0075; F02F 2007/0078; F01L 1/02; F01L 1/022; F01L 1/024; F01M 11/02
  See application file for complete search history.

(56) References Cited

U.S. PATENT DOCUMENTS

| | | | | |
|---|---|---|---|---|
| 4,741,299 A * | 5/1988 | Matsuura | ........... | F01L 1/02 123/90.31 |
| 4,869,708 A * | 9/1989 | Hoffmann | ........... | F01L 1/022 474/140 |
| 6,182,624 B1 * | 2/2001 | Ozeki | ........... | F02B 75/20 123/195 A |
| 6,213,073 B1 * | 4/2001 | Iwata | ........... | F16H 7/0836 123/90.31 |
| 6,325,033 B1 * | 12/2001 | Iwata | ........... | F16H 7/0836 123/90.31 |
| 6,561,156 B2 * | 5/2003 | Iizuka | ........... | F01L 1/02 123/90.31 |
| 6,923,154 B2 * | 8/2005 | Gschwindt | ........... | F02F 7/0073 123/195 C |
| 7,007,648 B2 * | 3/2006 | Fujikubo | ........... | F16H 7/08 123/90.34 |
| 7,836,859 B2 * | 11/2010 | Iwata | ........... | F02F 7/0073 123/90.38 |
| 7,886,711 B2 * | 2/2011 | Iwata | ........... | F01M 11/02 74/609 |
| 8,353,268 B2 * | 1/2013 | Hicks | ........... | F02B 67/04 123/193.5 |
| 8,511,268 B2 * | 8/2013 | Hoshito | ........... | F01L 1/34 123/90.17 |
| 8,714,124 B2 * | 5/2014 | Koiwa | ........... | F02F 7/0073 123/90.38 |
| 9,587,719 B2 * | 3/2017 | Shiraoya | ........... | F16H 7/08 |
| 10,487,937 B2 * | 11/2019 | Sakaguchi | ........... | F01M 9/06 |
| 11,168,589 B2 * | 11/2021 | Endo | ........... | F01L 1/022 |
| 11,408,311 B2 * | 8/2022 | Shirakawa | ........... | F16H 57/0423 |
| 2002/0170525 A1 * | 11/2002 | Iizuka | ........... | F01L 1/053 123/196 R |
| 2004/0005952 A1 * | 1/2004 | Bachmair | ........... | F01L 1/02 474/140 |
| 2004/0069260 A1 * | 4/2004 | Fujikubo | ........... | F16H 7/08 123/90.31 |
| 2004/0149250 A1 | 8/2004 | Gschwindt et al. | | |
| 2005/0130776 A1 * | 6/2005 | Markley | ........... | F16H 7/24 474/140 |
| 2009/0036241 A1 | 2/2009 | Tirayama et al. | | |
| 2009/0186725 A1 * | 7/2009 | Jouraij | ........... | F01L 1/344 474/110 |
| 2009/0188465 A1 * | 7/2009 | Iwata | ........... | F02F 7/0073 123/195 C |
| 2011/0015014 A1 * | 1/2011 | Kroon | ........... | F16H 7/08 474/111 |
| 2011/0197840 A1 * | 8/2011 | Hoshito | ........... | F01L 1/34 123/90.17 |
| 2011/0277726 A1 * | 11/2011 | Hicks | ........... | F02B 67/04 123/196 R |
| 2014/0349795 A1 * | 11/2014 | Shiraoya | ........... | F16H 7/08 474/110 |
| 2017/0254409 A1 * | 9/2017 | Sakaguchi | ........... | F02F 7/0073 |
| 2018/0010492 A1 * | 1/2018 | Shirakawa | ........... | F16H 57/035 |
| 2018/0283506 A1 * | 10/2018 | Okada | ........... | F01L 1/022 |
| 2018/0291987 A1 * | 10/2018 | Maeda | ........... | F16H 7/18 |
| 2020/0032679 A1 * | 1/2020 | Endo | ........... | F01M 9/10 |
| 2022/0228649 A1 * | 7/2022 | Nyga | ........... | F16H 7/06 |
| 2023/0184311 A1 * | 6/2023 | Nyga | ........... | F01L 1/053 474/140 |

FOREIGN PATENT DOCUMENTS

| | | | | |
|---|---|---|---|---|
| DE | 102018130732 A1 * | 5/2020 | ............ | F02B 67/06 |
| DE | 102018130733 A1 * | 5/2020 | ............ | F02B 67/06 |
| EP | 0848139 A1 * | 12/2002 | ............ | F02B 67/06 |
| EP | 1321631 B1 * | 3/2005 | ............ | F16H 7/02 |
| JP | H08-200088 A | 8/1996 | | |
| JP | 2006-070758 A | 3/2006 | | |
| JP | 2009-036273 A | 2/2009 | | |
| JP | 2020012452 A * | 1/2020 | ............ | F01M 1/02 |
| WO | WO-2018061086 A1 * | 4/2018 | ............ | F02B 61/02 |
| WO | WO-2019201391 A1 * | 10/2019 | ............ | F16H 7/18 |
| WO | WO-2021122332 A1 * | 6/2021 | ........ | B25B 27/0035 |

* cited by examiner

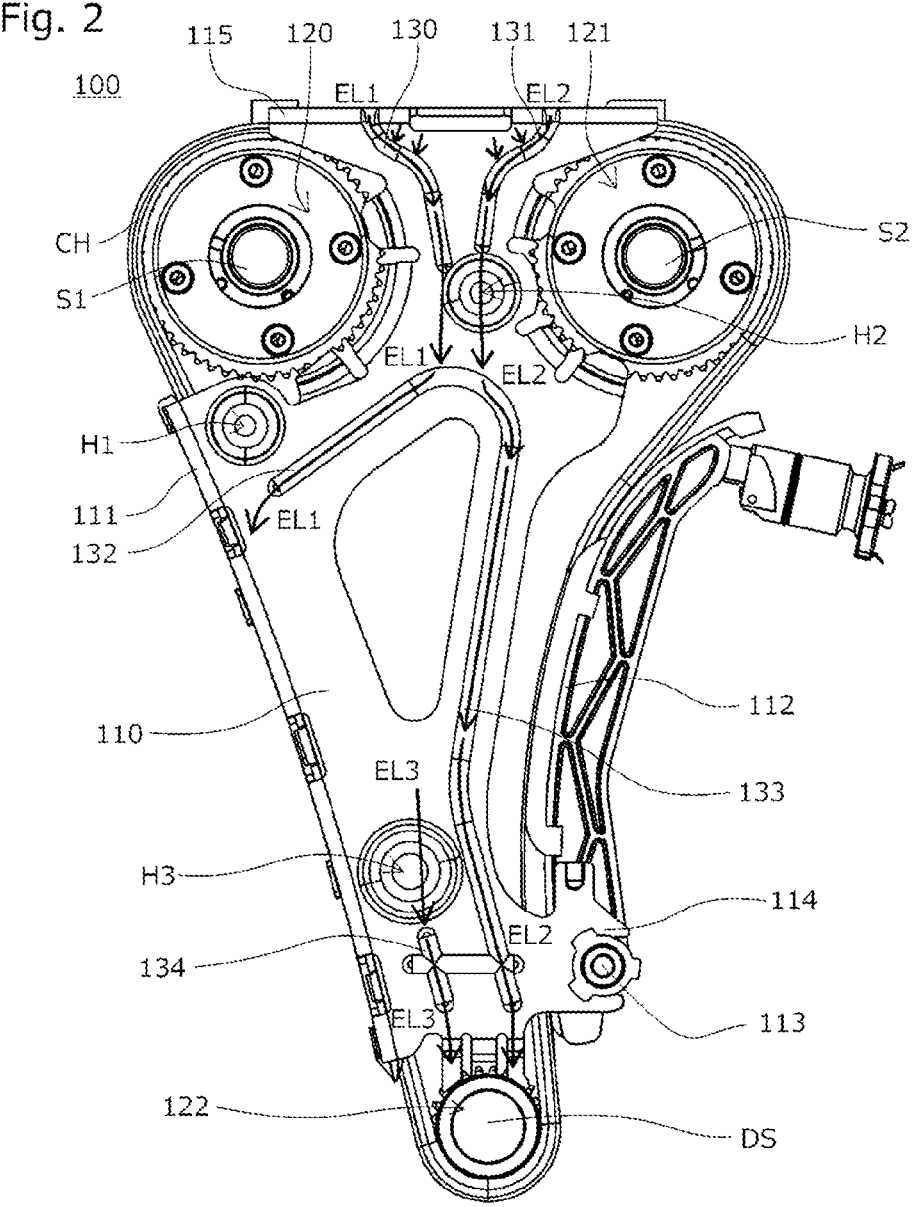

CHAIN GUIDE ASSEMBLY FRAME

BACKGROUND OF THE INVENTION

1. Field of the Invention

The present invention relates to a chain guide assembly frame used, for instance, in a timing system of an engine.

2. Description of the Related Art

The tensioner lever described in Japanese Patent Application Publication No. 2009-036273 has a conventionally known configuration for efficient use of lubricating oil in a chain guide assembly used, for instance, in a timing system of an engine.

The pivoting chain guide (tensioner lever 100) described in Japanese Patent Application Publication No. 2009-036273 is attached to an inner wall E of an engine via a pivot shaft (shoulder bolt SB) passed through an axial support boss 130. An oil guide groove 131 is formed by cutting off an outer peripheral portion of the axial support boss 130 radially inward to guide oil (engine oil O) that gathered and adhered on the lever body 120 toward a bolt passage area 132 of the axial support boss 130.

Thus, when the lever is attached to the inner wall E of the engine, with the lengthwise distal end of the lever being oriented upward and the axial support boss 130 at the lengthwise base end of the lever being oriented downward, the oil (engine oil O) that gathered and adhered on the inner wall E of the engine flows down along both front and back sides of the lever body 120 and infiltrates the entire bolt passage area 132 of the axial support boss 130, regardless of whether the axial support boss 130 is making tight contact with the inner wall E of the engine or with a flange Sf of the pivot shaft (shoulder bolt SB). This way, the oil (engine oil O) on the inner wall E of the engine can be maximally utilized as lubricating oil in an efficient manner to suppress galling, seizure, uneven wear, and friction loss that the pivot shaft (shoulder bolt SB) tends to suffer and favorable durability can be ensured. Smooth pivoting motion of the chain guide to follow the movement of the drive chain C can be also ensured, giving a correct tension to the chain in concert with a tensioner T.

An oil communication passage 123 integrally formed to the lever body 120 at the foot of inclined reinforcing ribs 122 also ensures smooth continuous flow of the oil (engine oil O) that gathered and adhered on the entire lever body 120 from the distal end to the base end without being stopped by the reinforcing ribs 122. This way, the excess oil (engine oil O) gathering and adhering on the entire lever body 120 can be supplied into the oil guide groove 131 at the base end efficiently.

SUMMARY OF THE INVENTION

The configuration for efficient use of lubricating oil in the pivoting chain guide described in Japanese Patent Application Publication No. 2009-036273 still has some scope of improvement.

Namely, the pivoting chain guide described in Japanese Patent Application Publication No. 2009-036273 is designed to suppress galling, seizure, uneven wear, and friction loss of the pivot shaft by collecting and guiding the oil that adhered to the lever body toward the pivot shaft. On the other hand, oil that adhered to other parts of the chain guide assembly than the pivoting chain guide is not collected or guided. Efficient use of the oil for other parts than the pivoting chain guide is not possible when, for example, the chain, or a fixed chain guide that slidably guides the chain, or a drive sprocket the chain is passed around, are not supplied with sufficient oil. As a result, the overall amount of use of the oil has to be increased.

The present invention solves these problems, and aims at providing a chain guide assembly frame capable of efficiently collecting the oil that adhered to various parts of the chain guide assembly, and guiding the collected oil to predetermined locations, to allow efficient use of oil, with a simple structure.

The present invention solves the above problems by providing a chain guide assembly frame including a main body and a driven sprocket holding portion that clamps a driven sprocket in an upper part of the main body, the main body including a fixed chain guide, and a pivoting chain guide holding portion to which a pivoting chain guide is mountable. The driven sprocket holding portion includes a fixed-guide-side sprocket holding portion provided on a fixed chain guide side, and a pivoting-guide-side sprocket holding portion provided on a pivoting chain guide holding portion side. The main body includes a drive sprocket holding portion holding a drive sprocket and located lower than the driven sprocket holding portion. The main body includes a concave and/or convex oil passage extending from an upper part toward a lower part to guide oil toward above the drive sprocket holding portion.

The chain guide assembly frame according to claim 1 includes a concave and/or convex oil passage in the main body, extending from an upper part downward to guide oil toward an area above the drive sprocket holding portion. The oil that adhered in the upper part of the main body is thus collected into the oil passage, and reliably guided toward the drive sprocket holding portion in the lower part of the main body. Therefore, the drive sprocket can be lubricated sufficiently with a reduced amount of oil compared to the case where no oil passage is provided.

According to the configuration set forth in claim 2, the oil passage, at a lower end thereof on a drive sprocket holding portion side, diverges into a fixed-guide-side oil passage formed extending toward the fixed chain guide and a pivoting-guide-side oil passage formed extending toward the pivoting chain guide holding portion. The oil that adhered in the upper part of the main body can be guided not only to the drive sprocket but also to the fixed chain guide that makes sliding contact with the chain, and the pivoting chain guide holding portion. Various parts can be supplied with oil in a more efficient manner in this way and sufficiently lubricated with a reduced amount of oil compared to the case where no oil passage is provided.

According to the configuration set forth in claim 3, the main body includes a top guide. The oil passage includes an upper oil passage formed extending from the top guide through between the fixed-guide-side sprocket holding portion and the pivoting-guide-side sprocket holding portion, and a lower oil passage formed at a position lower than the upper oil passage. The oil that adhered around the top guide can be reliably collected into the upper oil passage, and guided to between the fixed-guide-side sprocket holding portion and the pivoting-guide-side sprocket holding portion. The oil guided from the upper oil passage is then guided to various parts from the lower oil passage. Various parts can thus be supplied with oil in a more efficient manner.

According to the configuration set forth in claim 4, the upper oil passage has a lower end formed to be positioned directly above a topmost part of the lower oil passage. The lower oil passage may diverge midway, but the oil is guided directly from the upper oil passage to the lower oil passage before the diverging point, so that a sufficient amount of oil can be reliably guided from the upper oil passage to both destinations of the diverged lower oil passage.

According to the configuration set forth in claim 5, the upper oil passage diverges to have a lower end formed to be positioned directly above the fixed-guide-side lower oil passage and a lower end formed to be positioned directly above the pivoting-guide-side lower oil passage. Therefore, the oil can be guided reliably and sufficiently from the upper oil passage to both of the fixed-guide-side lower oil passage and pivoting-guide-side lower oil passage.

According to the configuration set forth in claim 6, the upper oil passage includes a fixed-guide-side upper oil passage formed on a fixed-guide-side sprocket holding portion side, and a pivoting-guide-side upper oil passage formed on a pivoting-guide-side sprocket holding portion side. In the case where the top guide stretches over a wide area as far as above the fixed-guide-side sprocket holding portion and pivoting-guide-side sprocket holding portion, a substantial amount of oil that adhered to a wide area of the top guide can be collected, so that more oil can be guided to various parts through the oil passage.

According to the configuration set forth in claim 7, the fixed-guide-side upper oil passage has a lower end formed to be positioned directly above the fixed-guide-side lower oil passage, and the pivoting-guide-side upper oil passage has a lower end formed to be positioned directly above the pivoting-guide-side lower oil passage. The amount of oil collected from near the top guide by each of the fixed-guide-side upper oil passage and pivoting-guide-side upper oil passage can be adjusted by varying the positions or shapes of their upper ends. The ratio of oil to be supplied to the fixed-guide-side lower oil passage and pivoting-guide-side lower oil passage can thus be adjusted to guide an adequate amount of oil to various parts for even more suitable lubrication.

According to the configuration set forth in claim 8, the pivoting-guide-side oil passage has a lower end formed to be positioned directly above the drive sprocket holding portion. Therefore, oil can be guided reliably from the upper part of the main body to the drive sprocket holding portion.

According to the configuration set forth in claim 9, the oil passage is formed in a weld bead shape. Therefore, the oil passage, which may be either concave or convex, can be formed on both front and back sides of the main body by a single machining process.

Moreover, the oil passage formed as a weld bead on the surface of the main body can increase the strength of the main body itself.

BRIEF DESCRIPTION OF THE DRAWINGS

FIG. 2 is an overall view of the chain guide assembly frame 100 according to one embodiment of the present invention mounted to an engine.

DESCRIPTION OF THE PREFERRED EMBODIMENTS

Figure 1:
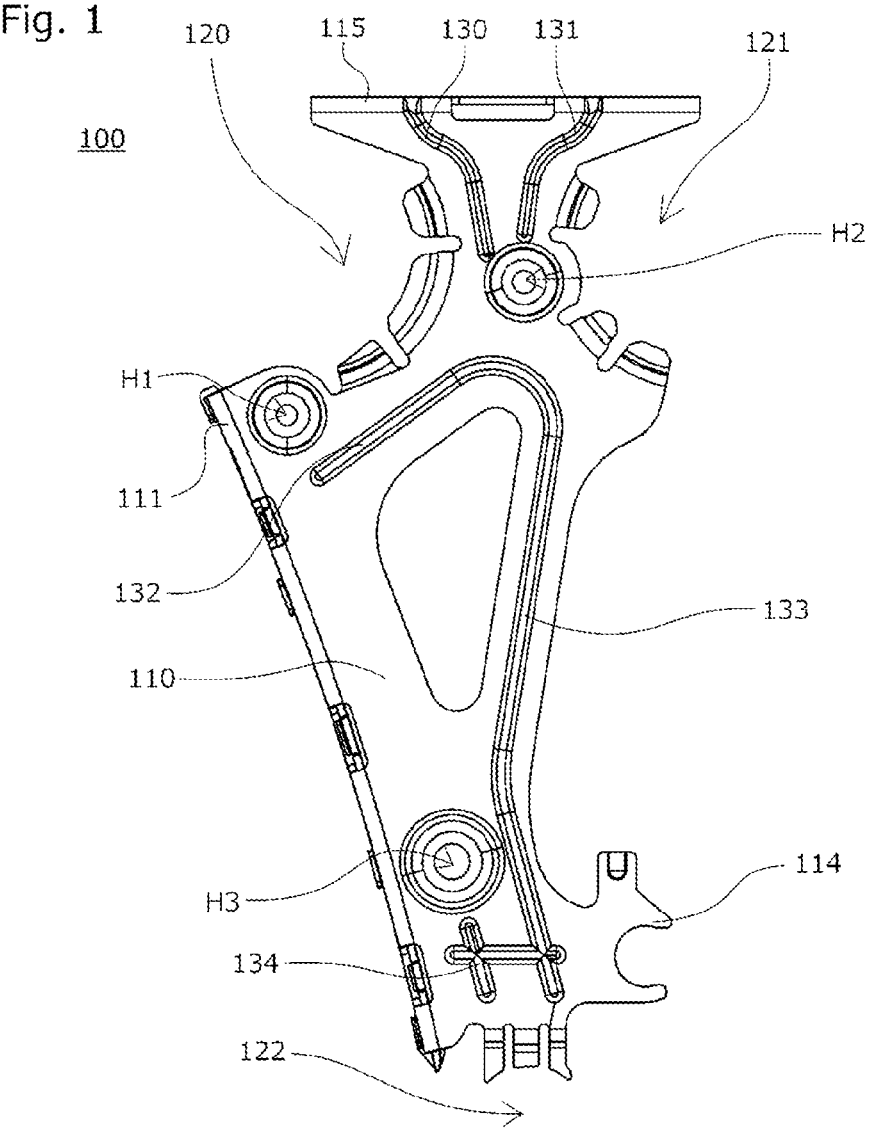
FIG. 1 is an overall view of a chain guide assembly frame 100 according to one embodiment of the present invention.

A chain guide assembly frame 100 according to one embodiment of the present invention will be hereinafter described with reference to the drawings.

For ease of explanation, FIG. 2 does not illustrate the engine, or connection members that connect the engine and the frame 100.

As shown in FIG. 1, the chain guide assembly frame 100 includes a main body 110, a top guide 115 provided on the upper surface of the main body 110, a fixed chain guide 111 provided on one side face of the main body 110, and a pivoting chain guide holding portion 114 to which a pivoting chain guide 112 can be attached on a side face of the main body 110 opposite from the fixed chain guide 111. A fixed-guide-side sprocket holding portion 120 is provided in an upper part of the main body 110 on the same side as the fixed chain guide 111, and a pivoting-guide-side sprocket holding portion 121 is provided in an upper part of the main body 110 on the same side as the pivoting chain guide holding portion 114. A drive sprocket holding portion 122 that can hold a drive sprocket DS is provided in a lower part of the main body 110.

Mounting holes H1, H2, H3 used when fixing the frame to an engine (not shown) are provided in various parts of the main body 110.

An oil passage including a fixed-guide-side upper oil passage 130 and a pivoting-guide-side upper oil passage 131 is formed in a vertically extending weld bead shape, i.e., convex on one side of the main body 110 and concave on the other side, each extending from near the top guide 115 between the fixed-guide-side sprocket holding portion 120 and the pivoting-guide-side sprocket holding portion 121 as far as to near the mounting hole H2.

Below the mounting hole H2 are provided a fixed-guide-side lower oil passage 132 that is an oil passage extending from near the mounting hole H2 gradually downward and toward the fixed chain guide 111, and a pivoting-guide-side lower oil passage 133 that is an oil passage extending from near the mounting hole H2 gradually downward as far as to near the drive sprocket holding portion 122, passing on the side of the pivoting chain guide holding portion 114 of the main body 110. The fixed-guide-side lower oil passage 132 and pivoting-guide-side lower oil passage 133 are connected at their tops near the mounting hole H2.

An auxiliary oil passage 134 that is an oil passage running parallel to a lower part of the pivoting-guide-side lower oil passage 133 is formed below the mounting hole H3.

The fixed-guide-side lower oil passage 132, pivoting-guide-side lower oil passage 133, and auxiliary oil passage 134 are formed as weld beads similarly to the fixed-guide-side upper oil passage 130 and pivoting-guide-side upper oil passage 131.

Since the fixed-guide-side upper oil passage 130, pivoting-guide-side upper oil passage 131, fixed-guide-side lower oil passage 132, pivoting-guide-side lower oil passage 133 and auxiliary oil passage 134 are formed as weld beads as described above, they can help minimize deflection of the main body 110 and increase the strength.

Next, how oil EL is guided in the chain guide assembly frame 100 according to one embodiment of the present invention will be described with reference to FIG. 2.

As shown in FIG. 2, the chain guide assembly frame 100 holds a driven sprocket S1 in the fixed-guide-side sprocket holding portion 120, holds a driven sprocket S2 in the pivoting-guide-side sprocket holding portion 121, and holds a drive sprocket DS in the drive sprocket holding portion 122. A chain CH is passed around the driven sprockets S1 and S2, and drive sprocket DS.

The pivoting chain guide 112 is pivotably connected to the pivoting chain guide holding portion 114 via a pivot shaft 113, to press the chain CH and create a predetermined tension in the chain CH.

The chain CH is passed around such as to make sliding contact with the fixed chain guide 111, pivoting chain guide 112, and top guide 115.

The chain guide assembly frame 100 is attached to the engine (not shown) via the mounting holes H1, H2, and H3 in this state.

Oil EL is supplied to the chain guide assembly attached to the engine (not shown) for lubricating the chain CH and various parts of the chain guide assembly. Some of the oil EL, squirted when supplied to the chain guide assembly, or scattered by spinning driven sprockets S1 and S2 or drive sprocket DS, or splashing from the running chain CH in sliding contact with the fixed chain guide 111, pivoting chain guide 112, and top guide 115, directly adheres to the main body 110. Some of the oil EL in mist form floating around the frame 100 of the chain guide assembly also adheres to the main body 110.

While it depends on from where the oil EL is supplied, the oil EL generally adheres more in upper parts of the main body 110 and flows down slowly along the main body 110.

Since the fixed-guide-side upper oil passage 130 and pivoting-guide-side upper oil passage 131 are provided in upper parts of the main body 110, the oil EL 1 that adhered around the fixed-guide-side sprocket holding portion 120 near the top guide 115 is collected in the fixed-guide-side upper oil passage 130. The oil EL 2 that adhered around the pivoting-guide-side sprocket holding portion 121 near the top guide 115 is collected in the pivoting-guide-side upper oil passage 131. The oil EL 1 and EL 2, after traveling along the respective weld bead shapes of the fixed-guide-side upper oil passage 130 and pivoting-guide-side upper oil passage 131 and reaching the lower ends, flows down from the respective oil passages.

The fixed-guide-side upper oil passage 130 and pivoting-guide-side upper oil passage 131 have their respective upper ends positioned closer to the fixed-guide-side sprocket holding portion 120 and pivoting-guide-side sprocket holding portion 121, and lower ends positioned closer to the center of the main body 110. Therefore, oil EL 1 and EL 2 that adhered to the main body 110 above the fixed-guide-side upper oil passage 130 and pivoting-guide-side upper oil passage 131 can be efficiently collected from a wide area.

The oil EL 1 and EL 2 that flowed down from the respective lower ends of the fixed-guide-side upper oil passage 130 and pivoting-guide-side upper oil passage 131 is collected respectively in the fixed-guide-side lower oil passage 132 and pivoting-guide-side lower oil passage 133, and flows down from the lower ends along the weld bead shapes of the fixed-guide-side lower oil passage 132 and pivoting-guide-side lower oil passage 133.

Since the lower end of the fixed-guide-side lower oil passage 132 is positioned above the fixed chain guide 111, the oil EL 1 collected from around the top guide 115 is supplied to the fixed chain guide 111, whereby the slidability of the chain CH on the fixed chain guide 111 can be more improved.

Since the lower end of the pivoting-guide-side lower oil passage 133 is positioned directly above the drive sprocket holding portion 122, the oil EL 2 collected from around the top guide 115 is supplied to the drive sprocket DS. The drive sprocket DS can thus be lubricated in an efficient manner, and the oil EL 2 can be further supplied to the chain CH via the drive sprocket DS.

The pivoting-guide-side lower oil passage 133 extends along the main body 110 on the side of the pivoting chain guide holding portion 114 down to directly above the drive sprocket holding portion 122 and is not configured to collect oil EL 3 that adhered above the mounting hole H3 of the main body 110. However, the auxiliary oil passage 134 is formed below the mounting hole H3 so that the oil EL 3 is collected in the auxiliary oil passage 134.

Since the lower end of the auxiliary oil passage 134 is positioned directly above the drive sprocket holding portion 122, the oil EL 3 is also supplied to the drive sprocket DS. The drive sprocket DS can thus be lubricated more efficiently.

The oil EL that adhered to the main body 110 is collected in this way by the fixed-guide-side upper oil passage 130, pivoting-guide-side upper oil passage 131, fixed-guide-side lower oil passage 132, pivoting-guide-side lower oil passage 133, and auxiliary oil passage 134, and guided to predetermined locations. Therefore, various parts such as the chain CH and drive sprocket DS can be efficiently lubricated using a reduced amount of oil EL as compared to the case in which no oil passages are provided.

While one embodiment of the present invention has been described in detail, the present invention is not limited to the embodiment described above and may be carried out with various design changes without departing from the scope of the present invention set forth in the claims.

In the above-described embodiment, a fixed-guide-side upper oil passage and a pivoting-guide-side upper oil passage are formed in an upper part of the main body. The configuration of the oil passages to be provided in an upper part of the main body is not limited to this example. A fixed-guide-side upper oil passage and a pivoting-guide-side upper oil passage may be formed such as to merge on their way down, for example. One oil passage extending from an upper part of the main body may split into a fixed-guide-side upper oil passage and a pivoting-guide-side upper oil passage somewhere along the way down. Alternatively, the main body may be formed with only one oil passage.

In the above-described embodiment, a fixed-guide-side lower oil passage and a pivoting-guide-side lower oil passage are formed below the fixed-guide-side upper oil passage and pivoting-guide-side upper oil passage, and the upper ends of the fixed-guide-side lower oil passage and pivoting-guide-side lower oil passage are joined together. The configurations of the fixed-guide-side lower oil passage and pivoting-guide-side lower oil passage are not limited to this example. The fixed-guide-side lower oil passage and pivoting-guide-side lower oil passage may not be joined together, for example. There may be no fixed-guide-side lower oil passage or pivoting-guide-side lower oil passage. Alternatively, the lower end of the fixed-guide-side upper oil passage may be connected to the upper end of the fixed-guide-side lower oil passage.

In the above-described embodiment, the lower end of the fixed-guide-side lower oil passage is positioned above the fixed chain guide. The fixed-guide-side lower oil passage may have its lower end positioned anywhere, below the fixed chain guide for example, or directly above the mounting hole H3.

In the above-described embodiment, the lower end of the pivoting-guide-side lower oil passage is positioned directly above the drive sprocket holding portion. The pivoting-guide-side lower oil passage may have its lower end positioned anywhere, directly above the pivoting chain guide holding portion for example, or, the pivoting-guide-side lower oil passage may diverge somewhere to have lower ends, one directly above the pivoting chain guide holding portion and the other directly above the drive sprocket holding portion.

While an auxiliary oil passage is formed below the mounting hole H3 in the above-described embodiment, the configuration of the auxiliary oil passage is not limited to this example. There may be no auxiliary oil passage for example, or an auxiliary oil passage may be formed above the mounting hole H3 such that its lower end merges with the pivoting-guide-side lower oil passage.

While a top guide is provided at the top of the main body in the above-described embodiment, the frame configuration of the chain guide assembly is not limited to this example. The top guide may be omitted, for example.

While the oil passages described in the embodiment above are formed in a weld bead shape, the configuration of the oil passages is not limited to this example. The oil passages may be formed as grooves that are concave on both sides of the main body, for example, or as ridges protruding from both sides of the main body. Alternatively, the oil passages may be formed only on one side of the main body.

What is claimed is:

1. A chain guide assembly frame comprising a main body and a driven sprocket holding portion that is able to clamp a driven sprocket in an upper part of the main body, the main body including a fixed chain guide, and a pivoting chain guide holding portion that is able to mount a pivoting chain guide, the driven sprocket holding portion including a fixed-guide-side sprocket holding portion provided on a fixed chain guide side, and a pivoting-guide-side sprocket holding portion provided on a pivoting chain guide holding portion side, the main body including a drive sprocket holding portion that is able to hold a drive sprocket and located lower than the driven sprocket holding portion, the main body including a concave, convex, or concave-and-convex oil passage extending from the upper part toward a lower part to guide oil toward above the drive sprocket holding portion, the main body includes, in the upper part thereof, a top guide provided, and the oil passage includes an upper oil passage formed continuously extending from the top guide through between the fixed-guide-side sprocket holding portion and the pivoting-guide-side sprocket holding portion, and a lower oil passage formed at a position lower than the upper oil passage.

2. The chain guide assembly frame according to claim 1, wherein the oil passage, at a lower end thereof on a drive sprocket holding portion side, diverges into a fixed-guide-side oil passage formed extending toward the fixed chain guide and a pivoting-guide-side oil passage formed extending toward the pivoting chain guide holding portion.

3. The chain guide assembly frame according to claim 2, wherein the pivoting-guide-side oil passage has a lower end formed to be positioned directly above the drive sprocket holding portion.

4. The chain guide assembly frame according to claim 1, wherein the upper oil passage has a lower end formed to be positioned directly above a topmost part of the lower oil passage.

5. The chain guide assembly frame according to claim 1, wherein the lower oil passage includes a fixed-guide-side lower oil passage formed extending toward the fixed chain guide, and a pivoting-guide-side lower oil passage formed extending toward the pivoting chain guide holding portion, and the upper oil passage diverges to have a lower end to be positioned directly above the fixed-guide-side lower oil passage and a lower end to be positioned directly above the pivoting-guide-side lower oil passage.

6. The chain guide assembly frame according to claim 1, wherein the upper oil passage includes a fixed-guide-side upper oil passage formed on a fixed-guide-side sprocket holding portion side, and a pivoting-guide-side upper oil passage formed on a pivoting-guide-side sprocket holding portion side.

7. The chain guide assembly frame according to claim 6, wherein the lower oil passage includes a fixed-guide-side lower oil passage formed extending toward the fixed chain guide, and a pivoting-guide-side lower oil passage formed extending toward the pivoting chain guide holding portion, wherein the fixed-guide-side upper oil passage, the fixed-guide-side upper oil passage has a lower end formed to be positioned directly above the fixed-guide-side lower oil passage, and the pivoting-guide-side upper oil passage has a lower end formed to be positioned directly above the pivoting-guide-side lower oil passage.

8. The chain guide assembly frame according to claim 1, wherein the oil passage is formed in a weld bead shape.

* * * * *